United States Patent [19]

Takafuji

[11] Patent Number: 4,928,123

[45] Date of Patent: May 22, 1990

[54] PROJECTION TYPE LIQUID CRYSTAL DISPLAY DEVICE

[75] Inventor: Yutaka Takafuji, Nara, Japan

[73] Assignee: Sharp Kabushiki Kaisha, Osaka, Japan

[21] Appl. No.: 206,759

[22] Filed: Jun. 15, 1988

[30] Foreign Application Priority Data

Jun. 16, 1987 [JP] Japan .................. 62-150391

[51] Int. Cl.⁵ .............................. G03B 21/14
[52] U.S. Cl. ........................ 353/20; 353/81; 353/122; 353/38
[58] Field of Search ................. 353/122, 121, 38, 81, 353/20; 350/126, 127, 128, 129, 117, 333, 331 R, 352, 336

[56] References Cited

U.S. PATENT DOCUMENTS

| 1,610,423 | 12/1926 | Cawley | 353/20 |
| 2,358,070 | 9/1944 | Holmes et al. | 350/128 |
| 3,350,982 | 11/1967 | Marks | 353/20 |
| 3,792,922 | 2/1974 | Fournie | 353/20 X |

FOREIGN PATENT DOCUMENTS 61-38976 2/1986 Japan .

OTHER PUBLICATIONS

S.P.I.E. Optomechanical Systems Design, vol. 250, 1980, "Liquid Crystal Light Valve Projector", R. S. Gold.
IEEE Transactions on Electrical Devices, "Design of an Electrooptic Light Valve Proj. Display" by Moore, 5/1970, pp. 423-428.

Primary Examiner—Harry N. Haroian

[57] ABSTRACT

A projection type liquid crystal display device comprising a projector including a liquid crystal display element and a first polarizing plate for projecting an image displayed by the liquid crystal display element after polarization, the first polarizing plate for applying a specific polarized light component, and a screen on which the image projected by the projector is presented, wherein second polarizing plate is formed on the surface of the screen.

7 Claims, 2 Drawing Sheets

PROJECTION TYPE LIQUID CRYSTAL DISPLAY DEVICE

BACKGROUND OF THE INVENTION

The present invention relates to a projection type liquid crystal display device or more specifically to a projection type liquid crystal display device which projects and visualizes on a screen an image displayed by a liquid crystal display element.

FIG. 4 is a block diagram showing the construction of the conventional liquid crystal display device 1 which comprises a projector 2 and a screen 11. In the projector 2, light L from a light source 3 is directed by a reflection mirror 10 in the forward direction (in the leftward direction of FIG. 4) and collected by a condenser lens 4. The condensed light L passes through a heat absorbing filter 5 where heat is eliminated. Then the light is linearly polarized by a primary polarizing plate 6. The linearly polarized light then passes through a liquid crystal display element 7 where the polarized light is subjected to the optical rotatory modulation according to an image to be displayed. Then the light passes through a secondary polarizing plate 8 which transforms the light into a pattern of luminance in accordance with the image to be displayed. The pattern is enlarged by a projection lens 9 and projected on the external screen 11 located in the left of FIG. 4.

The screen 11 comprises a sheet material 12 and a reflection sheet 13 covering the surface of the sheet material 12. An image projected by the projector 2 onto the screen 11 is reflected by the reflection sheet 13 so that a viewer can see the image from the arrow direction X.

The above conventional projection type liquid crystal display device 1 can produce a picture of a high contrast on the screen 11 when no ambient light is incident on the screen 11, as for, in example, a darkroom. When it is light the room, however, the contrast of the picture on the screen 11 degrades severely, influenced by the ambient light incident on the screen 11, making the picture on the screen 11 difficult to see.

When the projection type liquid crystal display device 1 has a color display function, the influence of the ambient light is particularly prominent; R (red), G(green) and B(blue) mosaic color filters arranged in parallel corresponding to the display picture elements reduce the intensity of the transmitted light substantially.

SUMMARY OF THE INVENTION

Accordingly, it is an object of the present invention to provide a projection type liquid crystal display device capable of producing an image of improved definition by minimizing the reduction of the contrast of the image on a screen in a light environment.

It is another object of the present invention to provide a projection type liquid crystal display device which improves the contrast of an image by using only a specific polarized component light.

It is a further object of the present invention to provide a projection type liquid crystal display device including a beam splitter provided in a projector for obtaining a specific polarized light component and a polarizing plate provided on a screen.

Other objects and further scope of applicapability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to the present invention, a projection type liquid crystal display device comprises a projector including a liquid crystal display element and first polarizing means, for projecting an image displayed on the liquid crystal display element, the first polarizing means for applying a specific polarized light component to the liquid crystal display element, and a screen on which the image projected by the projector is visualized, the screen having second polarizing means on its surface.

In the liquid crystal display device of the present invention, a specific polarized light component linearly polarized by the first polarizing means, for example, P-polarized light component or S-polarized light component, is made to pass the liquid crystal display element for modulation in accordance with the image displayed on the liquid crystal display element and then projected onto a screen.

The second polarizing means is formed on the screen surface. If the screen is a light reflection type screen, the light from the projector is all reflected and observed at the light incident side through the second polarizing means while ½ of the ambient light incident to the screen is blocked by the second polarizing means. If the screen is a transmissive type screen, the light from the projector passes through the second polarizing means and is observed from the side opposite to the light incident site.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE EMBODIMENTS

Figure 1:
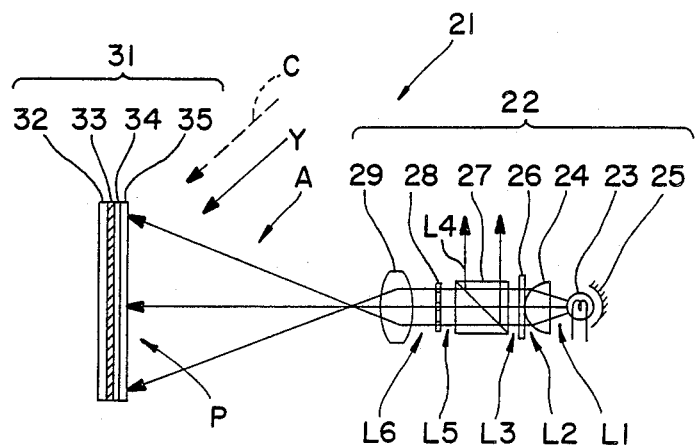
FIG. 1 is a block diagram showing the optical construction of the projection type liquid crystal display device according to an embodiment of the present invention.

FIG. 1 is a block diagram showing the optical contruction of a projection type liquid crystal display device 21 according to an embodiment of the present invention. The first embodiment of the present invention is a projection type liquid crystal display device of a reflective type. Light L1 from a light source 23 is collected by a condensing reflection mirror 25 and a condenser lens 24 to become light L2 directed leftward in FIG. 1. The light L2 passes through a heat absorbing filter 26 which eliminates heat by the light source 23.

Figure 4:
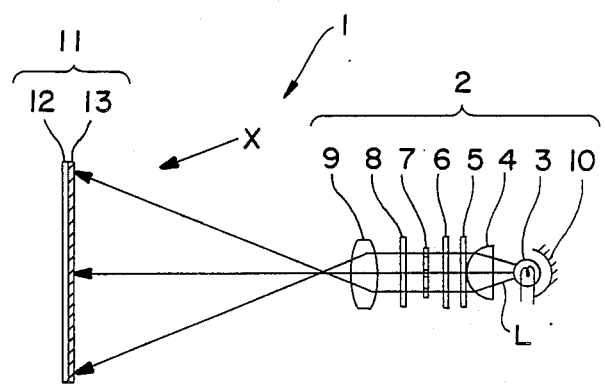
FIG. 4 is a block diagram showing the construction of the conventional projection type liquid crystal display device.

Light L3 passing the heat absorbing filter 26 enters a polarizing beam splitter 27 which is a first polarizing means which provides smaller light loss and higher reliability against light than the conventional polarizing plates 6 and 8 used in the conventional device shown in FIG. 4. The polarizing beam splitter 27 splits the light L3 into a S polarized light component L4 directed upward in FIG. 1 and a P polarized light component L5 directed leftward in FIG. 1. The two linearly polarized light components L4 and L5 cross each other at a right angle. The P polarized light component L5 enters a liquid crystal display element 28 and is modulated for polarization characteristic in accordance with the image displayed by the liquid crystal display element 28. Modulated light L6 is enlarged by a projection lens 29 and projected onto a light-reflecting screen 31 along the path indicated by the reference A.

The light-reflecting screen (hereinafter referred to simply by screen) 31 comprises a sheet material 32 made of, for example, vinyl chloride (such as PVC), a reflection surface formed by applying an aluminum sheet on the sheet material 32, a sheet 34 lenticulated in the vertical direction of the screen 31 to form a plurality of light-scattering layers in stripes, The sheet 34 applied on the reflection surface 33 to prevent the reflected light from scattering in the vertical direction of the screen 31, and a polarizing plate 35 applied on the sheet 34 as a second polarizing means. The sheet 34 may be omitted but it is more effective to use the sheet 34. The polarizing plate 35 has a polarizing axis in the horizontal (left-and-right) direction of the screen 31 when the P-polarized light component enters the liquid crystal display element 28.

The light projected onto the screen 31 by the projector 22 is reflected by the reflection surface 33 and observed from the side indicated by the the arrow Y through the polarizing plate 35. Since the light projected by the projector 22 has been polarized, the light reflected by the reflection surface 33 transmits through the polarizing plate 35 and is observed as it is. Meanwhile, ambient light C incident to the screen 31 as shown by a broken line is polarized by the polarizing plate 35 so that about 50% of it is blocked. Namely, according to the present invention, the influence by ambient light C is reduced to about a half of that by the conventional device.

Here, assuming the maximum luminance on the screen 31 with no ambient light is $B_0$ and the minimum luminance on the screen 31 with no ambient light is $B_1$, the contrast of a picture is $(B_0)/(B_1)$ both on the screen 11 of the conventional device shown in FIG. 4 and on the screen 31 of the present invention as shown in FIG. 1. When there is ambient light and when it is assumed that the luminance of the ambient light is $B_3$, the contrast by of the conventional device is:

$$(B_0+B_3)/(B_1+B_3) \quad (1)$$

whereas by the present invention in which the luminance of the ambient light is reduced to half, the contrast is:

$$(B_0+B_3/2)/(B_1+B_3/2) \quad (2)$$

Thus, the contrast of a picture of the present invention is better than that of the conventional device by the ratio represented by an expression obtained by dividing the expression (1) by the expression (2) as shown below:

$$\frac{(B_0 + B_3/2)(B_1 + B_3)}{(B_1 + B_3/2)(B_0 + B_3)} \quad (3)$$

The improved contrast results in an easy-to-see picture.

Figure 2:
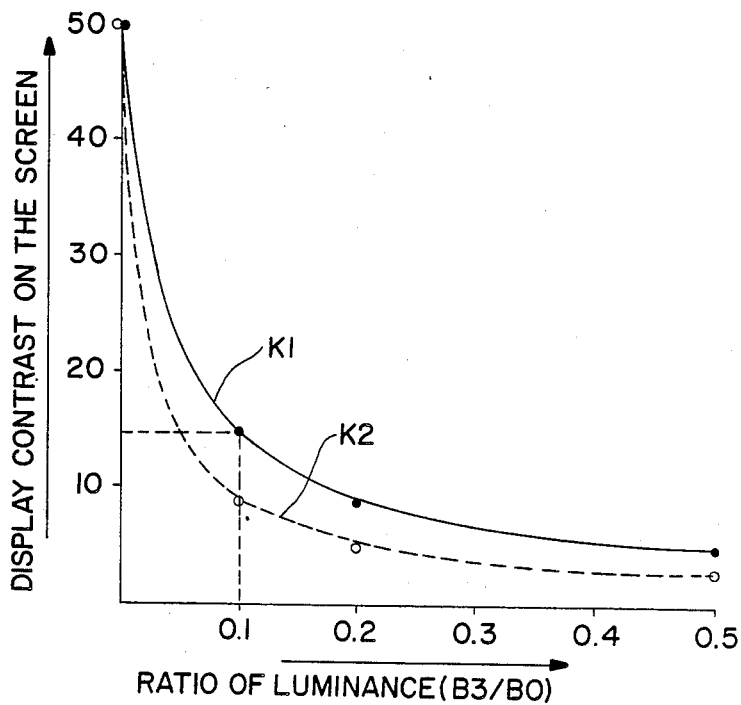
FIG. 2 is a graph comparing the contrast of a picture obtained by the embodiment of the present invention of FIG. 1 and that by the conventional device.

FIG. 2 is a graph for comparing the contrast of the present invention with that of the conventional device. In the graph, the horizontal axis represents the luminance $B_3$ of the ambient light to the maximum luminance $B_0$ of the light from the projector 22 ($B_3/B_0$), and the vertical axis represents the contrast of a picture on screen 31. A curve K1 shown by a solid line is for the present invention and a curve K2 shown by a broken line is for the conventional device. When $B_3/B_0$ is 1/10, that is, when the luminance of the ambient light is 1/10 of that of the light projected by the projector 22, the contrast obtained by the conventional device is less than 10 whereas the contrast obtained by the present invention is as high as about 15. When $B_3/B_0$ is ½, the contrast obtained by the present invention is still predominately better than the contrast obtained by the conventional device. Therefore, the contrast is improved as a result of the present invention.

As described above, the projection type liquid crystal display device according to an embodiment of the present invention condenses light emitted from the light source, polarizes it linearly by the polarizing means of little light loss and of good reliability against light, modulates the linearly polarized light in accordance with the image displayed by the liquid crystal display element by passing the light through the liquid crystal display element, and projects it onto the screen.

According to an embodiment of the present invention, as mentioned above, the light scattering layer and the polarizing means are formed on the light-reflecting screen surface whereby virtually all of the light projected by the projector onto the screen is reflected and observed through the polarizing means while about ½ of the ambient light incident to the screen is blocked by the polarizing means.

Consequently., the projection type liquid crystal display device of the present invention can produce a high definition picture of a remakably improved contrast on the screen even in a light environment because of the substantial reduction of the influence of ambient light.

In the present invention, a specific polarized light component obtained from first polarizing means such as the a polarizing beam splitter is used for displaying an image on the screen. For example, in the first embodiment of the present invention, the P-polarized light component is used as the specific polarized light component. However, the S-polarized light component may be used as the specific polarized light component in place of the P-polarized light component. Therefore, in the present invention, either the P-polarized light component or the S-polarized light component is used as the specific polarized light component. If the S-polarized light component is used, the polarizing plate 35 on the screen 31 has a polarizing axis in the vertical (upper-and-lower) direction of the screen. Therefore, the polarizing axis of each of the first polarizing means such as the polarizing beam splitter and the second polarizing means such as the polarizing plate 35 may be in the same direction.

Figure 3:
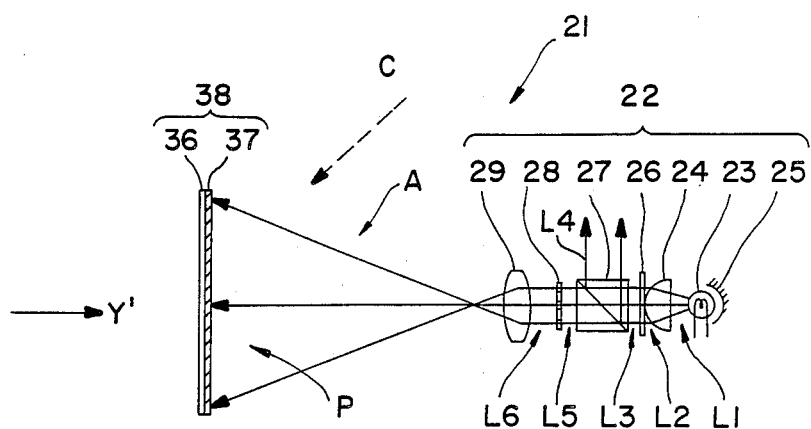
FIG. 3 is a block diagram showing the optical construction of a projection type liquid crystal display device according to another embodiment of the present invention.

FIG. 3 is a block diagram showing the optical construction of a projection type liquid crystal display device 21 in a transmissive type according to another embodiment of the present invention. The difference between the first embodiment of FIG. 1 and the embodiment of FIG. 3 is as follows. A transmissive type screen 38 is used in place of the light-reflecting screen 31 of FIG. 1. The transmissive type screen 38 comprises a light scattering plate 36 and a polarizing plate 37 as a second polarizing means.

The image on the screen 38 is observed from the side indicated by the arrow Y'. The light from the liquid crystal display element 28 is applied to the screen 38 and transmits through the polarizing plate 37 and the light scattering plate 36 to be seen as the image by the viewer. In this embodiment, either the P-polarized light component or the S-polarized light component may be used. If the P-polarized light component is used, the polarizing plate 37 of the screen 38 has the polarizing axis in the horizontal (left- and right) direction. If the S-polarizing light component is used, the polarizing plate 37 of the screen 38 has the polarizing axis in the vertical (upper-and-under) direction.

The present invention is also effective for a projection type liquid crystal color display device using three filters.

While only certain embodiments of the present invention have been described, it will be apparent to those skilled in the art that various changes and modifications may be made therein without departing from the spirit and scope of the present invention as claimed.

What is claimed is:

1. A liquid crystal display device comprising:
   a display screen; and
   a projector for projecting an image on said display screen;
   said projector including,
      a light source developing a light beam,
      a polarizing beam splitter polarizing said light beam in a first polarizing direction,
      a liquid crystal display modulating said light beam polarized by said polarizing beam splitter to form the image to be projected;
   said display screen including,
      polarizing means for polarizing said image projected by said projector, said polarizing means being arranged orthogonally to the first polarizing direction of said light beam polarized by said polarizing beam splitter, and
      a lenticulated sheet lenticulated orthogonally to said polarizing means for preventing scattering of light in a vertical direction of the display screen.

2. The device of claim 1, wherein said display screen is a transmissive type screen.

3. The device of claim 1, wherein said polarizing means provided on the screen reduces the amount of light incident to the screen from the environment.

4. The device of claim 1, wherein the projector further includes a condenser lens, a heat absorbing filter and a projection lens.

5. The device of claim 1, wherein said display screen includes a light reflecting layer, said polarizing means disposed over the light reflecting layer.

6. The device of claim 5, wherein said lenticulated sheet is formed between said light reflecting layer and said polarizing means.

7. The device of claim 1, wherein the polarized light beam polarized by said polarizing beam splitter is a light component selected from a group consisting of a P-polarized light component and an S-polarized light component.

* * * * *